(12) United States Patent
Patton et al.

(10) Patent No.: US 6,894,794 B1
(45) Date of Patent: May 17, 2005

(54) METHOD AND APPARATUS FOR MAKING A PRINT HAVING AN INVISIBLE COORDINATE SYSTEM

(75) Inventors: David L. Patton, Webster, NY (US); John R. Fredlund, Rochester, NY (US); John D. Buhr, Webster, NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 09/339,605

(22) Filed: Jun. 24, 1999

(51) Int. Cl.[7] .............................................. G06F 15/00
(52) U.S. Cl. ........................ 358/1.15; 358/1.9; 358/450; 358/540
(58) Field of Search ................................ 358/400, 407, 358/452, 437, 448, 453, 1.1, 1.14, 1.15, 1.9, 1.18, 450, 540

(56) References Cited

U.S. PATENT DOCUMENTS

| | | |
|---|---|---|
| 4,503,468 A | 3/1985 | Serinken et al. |
| 4,538,183 A | 8/1985 | Kanno et al. |
| 4,965,678 A | 10/1990 | Yamada |
| 5,016,096 A | 5/1991 | Matsunawa et al. |
| 5,075,787 A | 12/1991 | Shaughnessy et al. |
| 5,335,095 A | 8/1994 | Kageyama et al. |
| 5,360,235 A | 11/1994 | Drummeter et al. |
| 5,406,389 A | 4/1995 | Hasegawa et al. |
| 5,410,642 A * | 4/1995 | Hakamatsuka et al. .... 358/1.14 |
| 5,552,900 A | 9/1996 | Someya |
| 5,661,506 A | 8/1997 | Lazzouni et al. |
| 5,675,400 A | 10/1997 | Stephenson, III |
| 5,745,248 A | 4/1998 | Nickerson |
| 5,852,434 A | 12/1998 | Sekendur |
| 5,862,270 A * | 1/1999 | Lopresti et al. ............. 382/306 |
| 5,892,596 A | 4/1999 | Nonaka et al. |
| 6,132,024 A * | 10/2000 | Nelson ........................ 347/19 |
| 6,499,822 B1 * | 12/2002 | Abe et al. ..................... 347/19 |

FOREIGN PATENT DOCUMENTS

| | | |
|---|---|---|
| WO | 99/19823 | 4/1999 |
| WO | 99/50736 | 10/1999 |

\* cited by examiner

*Primary Examiner*—Mark Wallerson
(74) *Attorney, Agent, or Firm*—Frank Pincelli (57) ABSTRACT

A print and method of making a print having a invisible coordinate system on the same side as the image using a digital printer. The print may include additional invisible information which relates to specific parts of the image.

8 Claims, 8 Drawing Sheets

METHOD AND APPARATUS FOR MAKING A PRINT HAVING AN INVISIBLE COORDINATE SYSTEM

FIELD OF THE INVENTION

The present invention relates to encoding data onto a pictorial hardcopy print so that when the pictorial hardcopy print is digitally scanned by a scanner for reprinting and/or displaying of the image, the data provided on the print can be used to provide information about the image content and/or provide other informational data.

BACKGROUND OF THE INVENTION

In the prior art it has been suggested providing informational data on the hardcopy print in a manner that is visually indistinguishable from the image. For example, it has been suggested in various patent applications the printing of a hardcopy print using digital printing techniques wherein informational data is embedded in the image. Examples are set forth in copending U.S. Ser. No. 08/565,804, filed Nov. 30, 1995, by Scott J. Daly et al, entitled METHOD FOR EMBEDDING DIGITAL INFORMATION IN AN IMAGE; U.S. Ser. No. 08/596,818, filed Feb. 5, 1996, by Scott J. Daly, entitled METHOD AND APPARATUS FOR HIDING ONE IMAGE OR PATTERN WITHIN ANOTHER; U.S. Ser. No. 08/768,679, filed Dec. 18, 1996, by Chris W. Honsinger et al, entitled METHOD FOR DETECTING ROTATION AND MAGNIFICATION AND IMAGES; and U.S. Ser. No. 08/842,112, filed Apr. 28, 1997, by Chris W. Honsinger et al, entitled METHOD FOR GENERATING AN IMPROVED CARRIER FOR USE IN AN IMAGE DATA EMBEDDING APPLICATION. It has also been suggested in copending, commonly assigned U.S. Ser. No. 09/211,234, filed Dec. 14, 1998, by David L. Patton et al, entitled AUTO RESTORATION OF A PRINT, a means for providing a coordinate system, which is embedded into the digitally formed image, which can be used in relating other informational data that has also been encoded on the print to later printing and/or displaying of the image. All of the above U.S. applications are hereby incorporated by reference.

A problem with the foregoing disclosures is that in order to provide the informational data on the print which is not visible, digital printing techniques are used at the time of printing of the original print. This suffers from several drawbacks. First, this does not allow the addition of additional information later on. Secondly, while the original image is not distorted at some point, in order to avoid further degradation of the image the amount of information allowed is limited. In addition, this system also requires a scanner or computer techniques for observing of the information encoded in the hardcopy print.

Applicants have provided an improved method and apparatus wherein information can be put on the hardcopy print at the time of manufacturing of the print, or at some later date, which can be easily read and associated with the image.

SUMMARY OF THE INVENTION

In accordance with one aspect of the present invention there is provided a method for storing and retrieving information stored on a digital print, comprising the steps of:

a) obtaining a digital image file containing an image for printing by a digital printer;

b) printing the image onto a media using a digital printer so as to form a digital print; and c) printing a coordinate system on the media over the image that is not visible to the human eye under normal viewing conditions separate from the printing of the image, the coordinate system being capable of locating a specific area of the image on the digital print.

In accordance with yet another aspect of the present invention there is provided a print containing an image made using a digital printer and a coordinate system separate from the image made by a digital printer on the same side as the image, the coordinate system not being visible to the human eye under normal viewing conditions and capable of locating a specific location on the image, the print also containing additional data which is not visible to the human eye under normal viewing conditions and is printed on the same side of the image, the additional data and coordinate system is read by scanning the digital print, the coordinate system is used for associating the additional data with a specific image content located on the image.

The above, and other objects, advantages and novel features of the present invention will become more apparent from the accompanying detailed description thereof when considered in conjunction with the following drawings.

BRIEF DESCRIPTION OF THE DRAWINGS

In the detailed description of the preferred embodiments of the invention presented below, reference is made to the accompanying drawings in which.

DETAILED DESCRIPTION OF THE INVENTION

The present description will be directed in particular to elements forming part of, or in cooperation more directly with, the method and apparatus in accordance with the present invention. It being understood that elements not specifically shown or described may take various forms well known to those skilled in the art.

Figure 1:
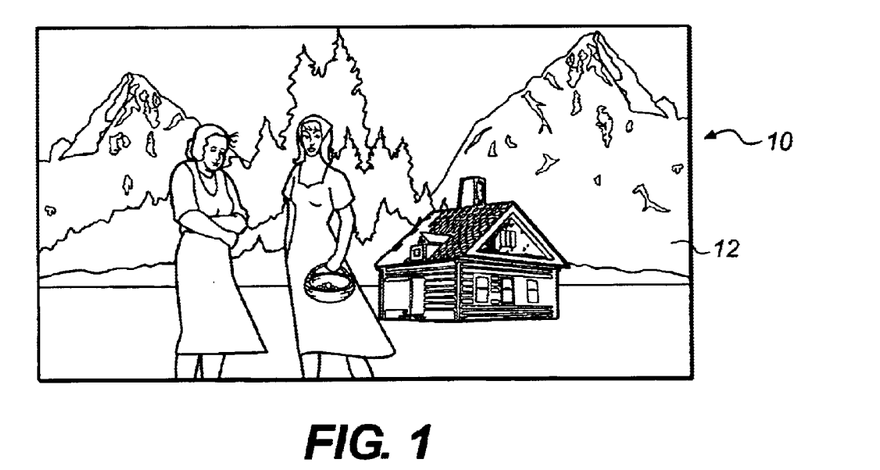
FIG. 1 is a typical hardcopy print having an image thereon.

Referring to FIG. 1, there is illustrated a hardcopy print 10 made in accordance with the present invention. The print 10 includes a digital image 12 placed thereon by a variety of known printing techniques. For example, but not by way of limitation, an image may be produced by optically or digitally printing the image 12 on a photosensitive media, for example, photographic paper, photographic film, or maybe printed on any other hardcopy media by any other known printing devices such as inkjet, thermal, LED, CRT, laser, etc. In the embodiment illustrated, print 10 is a photographic print having a color image 12 formed thereon by either a digital or optical printer. In addition to the image provided thereon, additional encoded information may be provided thereon, which is undetectable by the viewer. In the particular embodiment illustrated, this is accomplished by providing a printer, which can print directly on the hardcopy print information not normally visible by a viewer under normal viewing conditions. In the particular embodiment illustrated, this is obtained by using an infrared ink which is printed on the hardcopy print 10 after the image has been fully formed thereon. An example of a suitable ink may be obtained from the Eastman Kodak Company, under the tradename N.I.R.F. (near-infrared fluorophore). The information/indicia is printed on the print 10 so as to enable scanning thereon, which contains information that relates it to the image. In order to accomplish such, it is necessary to provide a coordinate system and information to be read.

Figure 2:
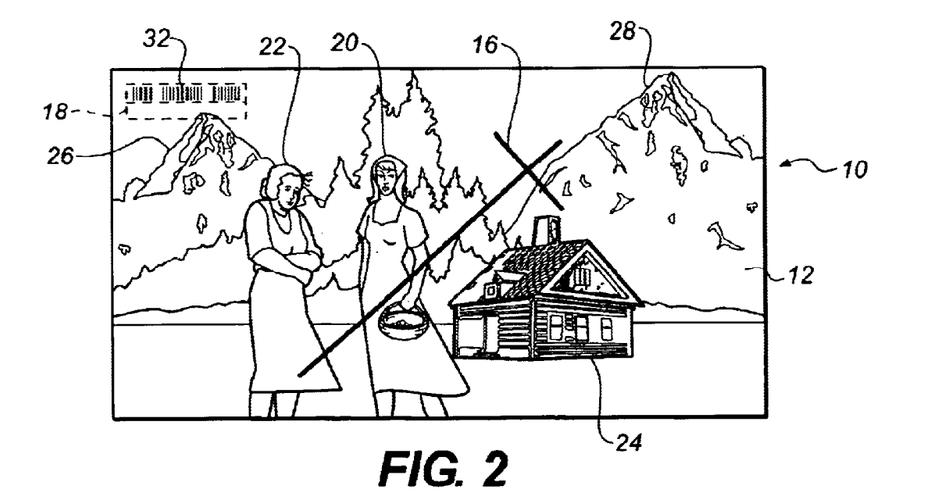
FIG. 2 is a view similar to FIG. 1 illustrating the invention of the present application.

Referring to FIG. 2, there is illustrated the print 10 of FIG. 1 illustrating information which is not normally visible in section 18 which can be read by a scanner. The information in section 18 (shown by dash lines) typically contains information which relates to the image on print 10. Preferably, as illustrated, print 10 includes a coordinate system 16 which provides a reference whereby certain features/items in the image 12 can be located and identified. The coordinate system 16 is also not normally visible by the viewer under normal viewing conditions, but can be scanned by a scanner. Preferably, as illustrated, the information 18 and coordinate system 16 are provided on the same side and directly over the image 12.

In the particular embodiment illustrated, image 12 illustrates two; individuals 20,22 in a scene which includes a house 24 and mountains 26,28. Additional information can be provided in machine-readable or human-readable form, which relate to the items in image 12. For example, informational section 18 may include the names of the individuals 20,22. Coordinate system 16 allows easy identification of the individuals or other items within the image 12. When the image 12 is scanned by a digital scanner, both the information relating to the image 12 and the information within section 18 is obtained in a single scanning operation. In the preferred embodiment, information within section 18 may further include a code 32 for identifying the particular type information contained therein, including information stating that the hardcopy print does include encoded information. In addition, the names of the individuals 20,22, mountains 26,28 and identification of items such as the house 24 can be provided. The coordinate system 16 allows the locating and identification of these items, which then can be later visually displayed, for example, on a CRT, or used to produce a second hardcopy print wherein the information is actually placed thereon without affecting or detracting from the visual appearance of the image 12.

Figure 3:
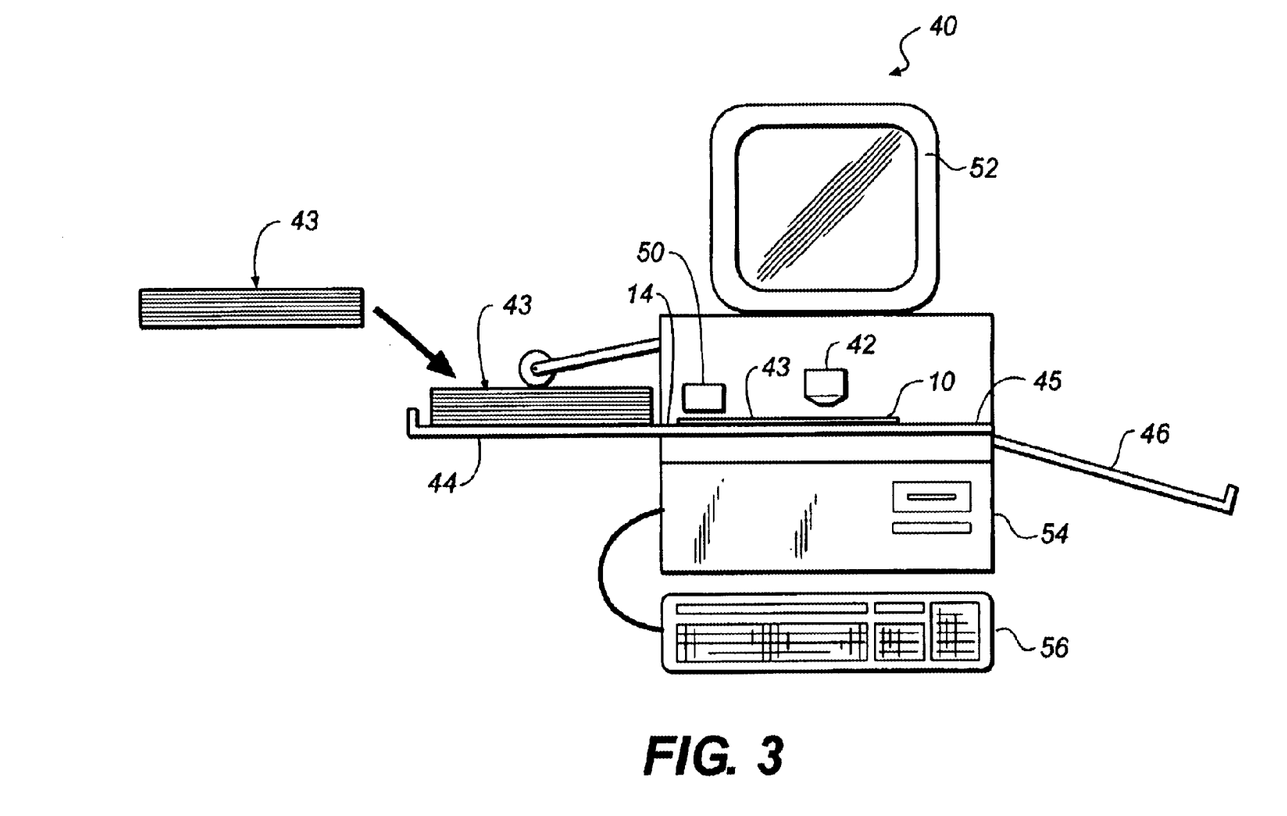
FIG. 3 is a schematic illustration of a printer for producing a hardcopy print in accordance with the present invention.

Referring to FIG. 3, there is illustrated in schematic form a printer 40 capable of printing onto a hardcopy print 10 using an ink, which is not normally visible by a viewer under normal viewing conditions. In the particular embodiment illustrated, printer 40 is an inkjet printer having a printhead 42 designed to apply any desired image appropriate on the media 43 as it passes therethrough. The printhead 42 prints directly over image 12 on print 10, however, since an invisible ink is being applied, the image 12 will be viewed as it would normally be viewed. The printer 40 includes an inlet/supply tray 44 for receiving media 43, such as hardcopy print 10, an outlet tray for retaining media that has been passed through the printer, and a printing path along which the photosensitive media passes from supply tray to outlet tray 46. The printhead 42 is positioned with respect to the printing path so as to provide printing onto media 43 as it passes thereby. An appropriate transport mechanism, not shown, is provided for transporting of the media from the supply tray 44 along the printing path 14 to outlet tray 46. In the embodiment illustrated, the hardcopy print 10 already has an image formed thereon in which case the informational data and coordinate system 16 is placed thereon by the printer 40. Thus, the informational data and coordinate system are separate from the image and printed at a different time. This information can be inputted in a variety of different manners. For example, the image could have been previously scanned and the information provided to a computer, such as a PC, and an appropriate software program could have been provided for illustrating a grid system and allowing of entry of information with respect to the grid system. For example, a mouse or other similar type control unit could have been used to identify certain areas of the image scanned and appropriate data/information can be entered with respect to such location for identifying persons, places, or things, and this information can be stored to a record file, which can be then forwarded over to a printer 40 for printing. The information regarding the image can be entered and/or forwarded to the printer 40 by a variety of known techniques, including hardwire connection or by the internet. Optionally, as illustrated in FIG. 3, the printer may be provided with a scanner 50, which scans the image prior to reaching the printhead 42 where the printhead provides the image. In particular, the image on hardcopy print 10 is scanned by the scanner 50 and displayed on display device 52, for example, a CRT or liquid crystal display. The printer 40 is controlled by an appropriate computer 54 whereby a super-imposed grid system can be provided over the image scanned and data entry can be entered through keyboard 56, or any other input device. The information is appropriately encoded and printed onto the image 12 through the use of printhead 42. Thus, the hardcopy print 10 leaving the printer 40 at outlet tray 46 will have thereon appropriate encoded information and an orientation system for properly identifying and using said information. The information in section 18 may also contain a code which can be read by a scanner which will identify that the hardcopy print 10 is of the type containing such information and the appropriate information necessary for interpreting the information, including the type of reference orientation provided thereon. Thus, the hardcopy print 10 will allow normal viewing of the image, yet when scanned by an appropriate scanner, will be able to read so as to obtain information not normally visible, which can then later be used for displaying, storing, or producing a hardcopy print which includes such information.

With respect to the ink used by printhead 42, the ink is such that it cannot be normally viewed by individuals, but is still capable of being read by a digital scanner. The scanner 30 may of any type digital scanner, for example, but not by way of limitation, AVISION 630CS, HP Scanjet 5100C, UMAX Powerlook 200, and Epson ES-1200C. Modification of these scanners is necessary to make the scanner to sense the infrared ink not normally visible. For example, the infrared blocking filter used to prevent infrared light from being sensed by the imager may be selectively removed when it is desired to scan the infrared record. Alternatively, a separate channel for sensing infrared light may be added to the imaging head. Additionally, an infrared light source may need to be added to the scanner. However, it is to be understood that any appropriate other digital scanner may be employed.

Figure 4:
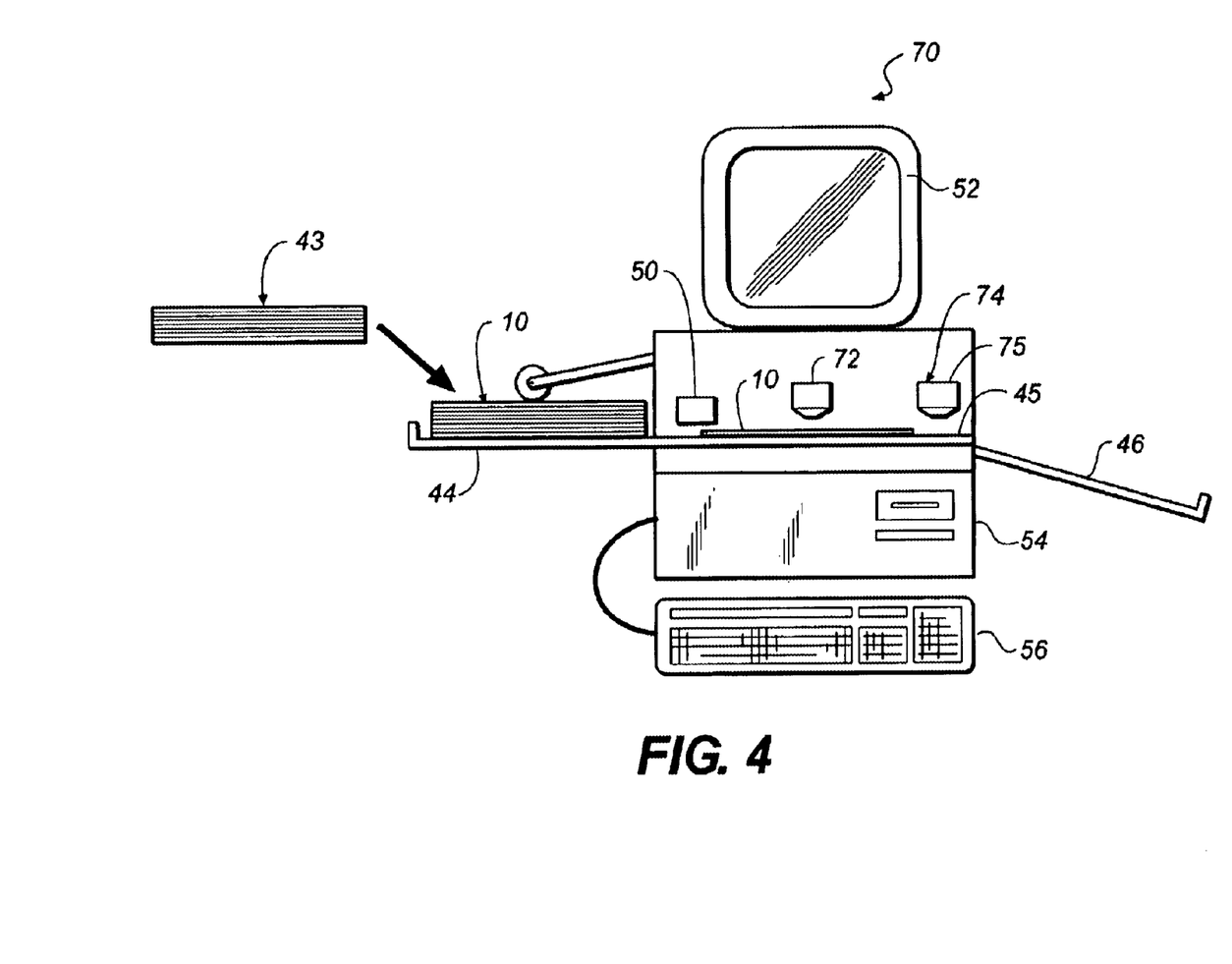
FIG. 4 is a schematic diagram of the system for scanning a hardcopy print made in accordance with the present invention whereby information is used for printing, displaying, or storing of the information scanned.

Referring to FIG. 4, there is illustrated a modified printing apparatus 70 made in accordance with the present invention. This apparatus 70 is similar to printing apparatus 40, like numerals indicating like parts and like operation. A printhead 72 is provided for printing of a digital image obtained from a digital image file/record onto the media passing thereby along printing path 48. In the particular embodiment illustrated, the printhead 72 comprises an ink-jet printhead, however, it is to be understood that any other desired digital printing system may be employed in place of printhead 72. The apparatus 70 includes a second printing system 74, which in the particular embodiment illustrated comprises a digital inkjet printhead 75 similar in operation and construction to printhead 72. The printhead 75 produces a orientation grid and data information as previously discussed with respect to printhead 42. A sufficient amount of spacing is provided between the printheads 72,74 such that the ink being applied by one will not substantially affect the ink being applied by the other.

While in the particular embodiment illustrated in FIG. 4 the image 10 is first produced on the media 43, followed by the placement of the information and grid, the present invention is not so limited. In particular, the location of the printheads 72,75 may be switched in their respective positions such that the invisible ink is placed on the media prior to formation of the customer generated image. Thus, the image applied by printhead 72 is provided after the application of the information and/or orientation system provided by printhead 75. The ink being applied is of such a nature that it can still be observed by a scanner through 0 the image applied by printhead 72. An example of a suitable ink used for printing of the customer image is sold by Eastman Kodak Company under the tradename KODAK PROFESSIONAL DYE INKS and an appropriate suitable ink for placement of the information and grid by printhead 72 is sold by Eastman Chemical Company under the tradename N.I.R.F. (near-infrared fluorophore) inks.

Figure 5:
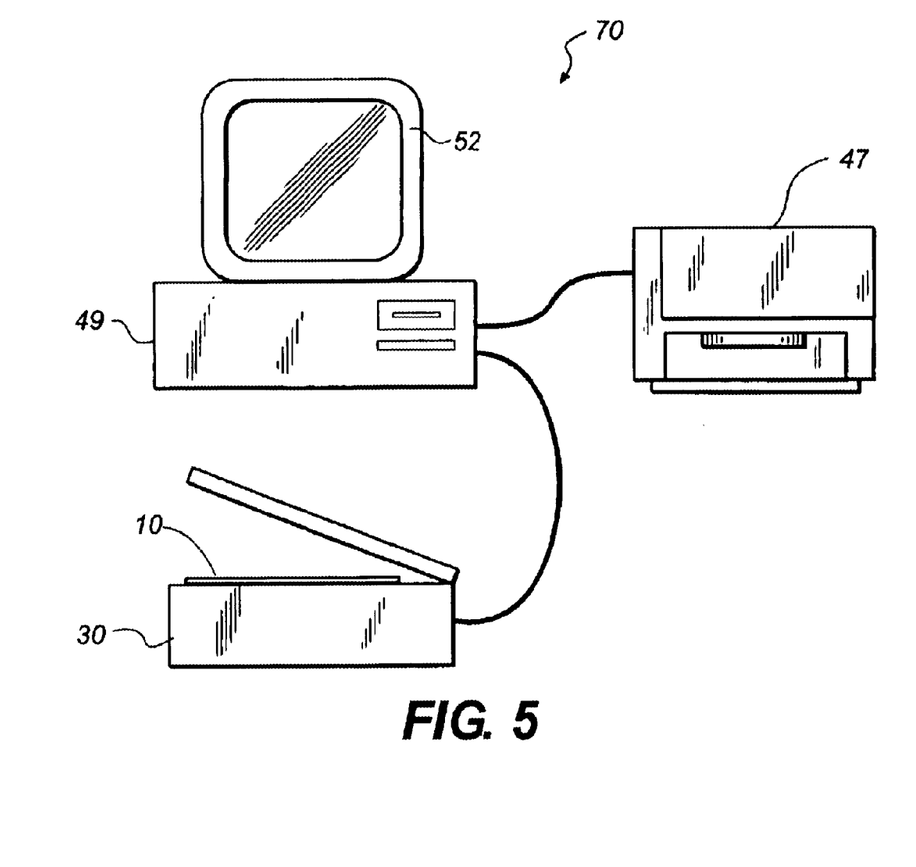
FIG. 5 is a schematic illustration of a modified system made in accordance with the present invention.

Referring to FIG. 5, there is illustrated a scanner and output system, which may be used to scan a hardcopy print 10 of the type having encoded invisible information as previously discussed. In particular, the system includes a digital scanner 30, which may be of any digital type as commonly available, for example, but not by way of limitation, a Vision 630CS, HP Scanjet 5100C, Newmax Power Look 200 and Epson ES 1200C. The image 12 on the hardcopy print 10 is scanned by scanner 30, thereby the appropriate information regarding the image is obtained as is typically done with prior art scanners. The scanner 30, in the embodiment illustrated, has been programmed to recognize and read informational data such as provided by section 18 and coordinate system 16. The coordinate system 16 is used primarily so that information contained in section 18 can be related to items objects in the image 12. An appropriate computer 49 is provided for interpreting of the data obtained by scanner and is sent forward to an appropriate output device 47. The output device 47 may comprise a variety of different digital output devices, for example, but not by way of limitation, various digital type printers, display devices, or storage memory devices whereby the information can then later be retrieved directly or through the internet, or other communication system.

Figure 6:
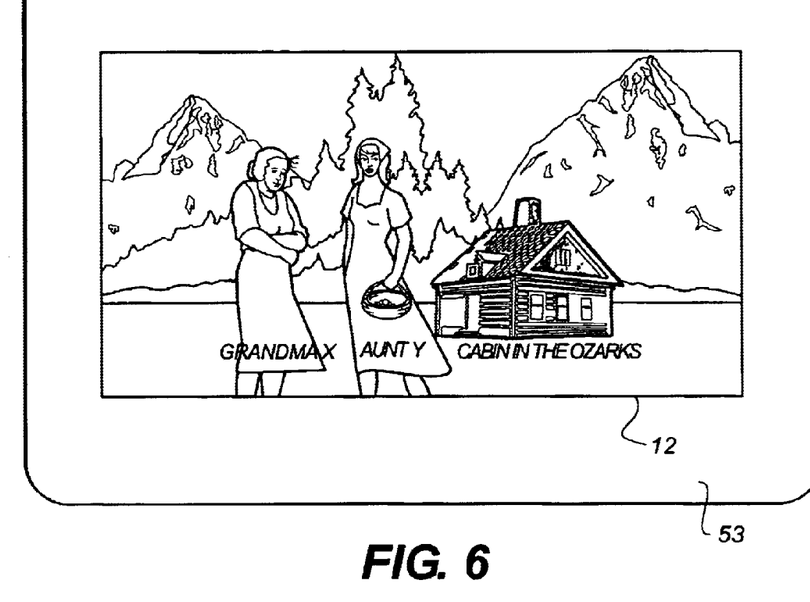
FIG. 6 is a plan view of a display screen illustrating an image made in accordance with the present invention.

Referring to FIG. 6, there is illustrated an image 12 on a display screen 53 obtained from scanning hardcopy print 10 on scanner 30 wherein information provided in information section 18 is displayed with respect to the objects or persons provided in the image 12. In the particular embodiment illustrated, it can be seen that the two individuals are identified as Grandma X and Aunt Y, and that the locations provided with respect to the cabin are illustrated therein. As previously noted, the output device 47 may include a printer, in which case the image with the annotated information may be printed if so desired.

Figure 7:
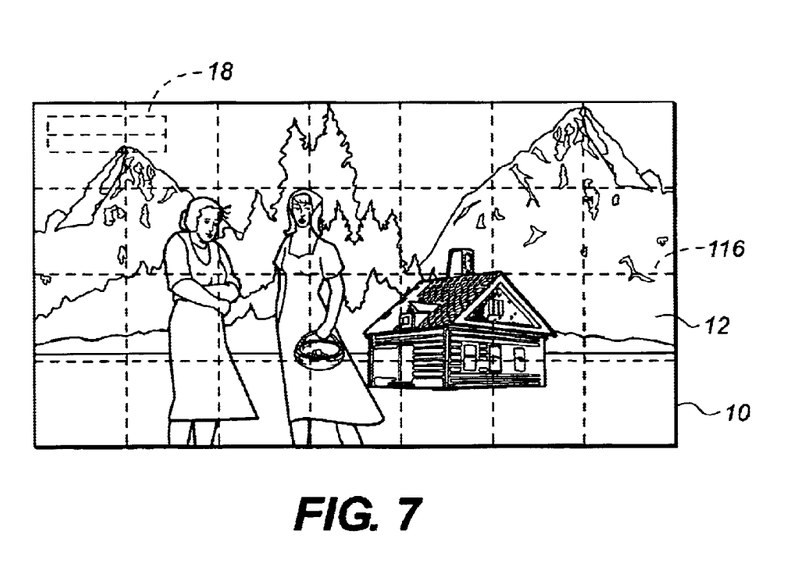
FIG. 7 is a hardcopy print made from information obtained during scanning.

It is to be understood that various modifications may be made without departing from the scope of the present invention. In particular, in FIG. 2 there is illustrated an coordinate system 16 in the form of an unique, symmetrical shape. However, the present invention is not limited to this particular type orientation system. Various other orientation system/patterns may be used as desired. The principal function of the coordinate system 16 is for providing a reference by which the information contained in section 18 may be associated with the particular items within the image 12. Referring to FIG. 7, there is illustrated a modified hardcopy print 10 made in accordance with the present invention. In this embodiment, there is provided an orientation system 116 in the form of a grid pattern. The information section would provide an appropriate code identifying the particular relationship with respect to the grid pattern so that particular items may be identified. It is, of course, understood that various other orientation schemes may be used as long as they are able to allow identification of particular locations within the image for locating encoded information in specific areas of the image 12.

In the embodiments illustrated in FIG. 2, the hardcopy print 10 includes information in machine-readable format. However, the present invention is not so limited. For example, referring to FIG. 8 there is illustrated a hardcopy print 210 made in accordance with the present invention, like numerals indicating like parts. However, in this embodiment, a grid 119 is provided along with informational information in a corner identifying certain objects with respect to the grid. This is particularly useful when the invisible ink being used can be viewed under special viewing conditions. For example, under normal viewing conditions the ink is such that it is not visible to the viewer, however, under ultraviolet light, typically referred to as a black light, the information printed thereon would be visible. In the particular embodiment illustrated, the information is provided in association with a grid 119, however, since the information can be viewed, the grid 119 may be dispensed with, and the information may be put directly in association therewith. In such situations, the grid 119 may be maintained so that any machine-readable information can still be scanned and associated with the image for later printing and storing of the image 12.

Figure 9:
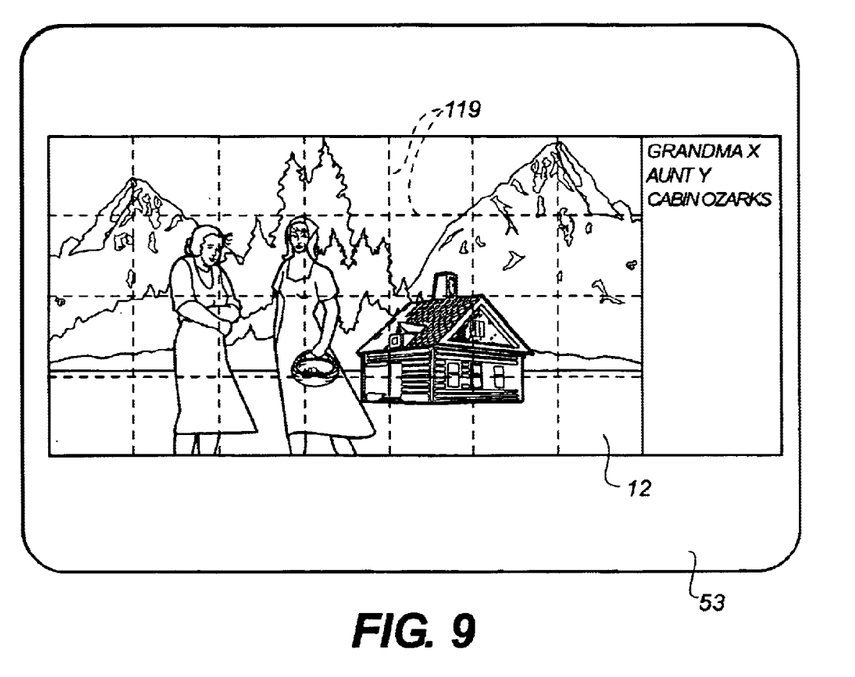
FIG. 9 is a plan view of a display device illustrating the image in a modified format.

Referring to FIG. 9, there is illustrated a modified form of the present invention illustrating a different way in which the information may be displayed. In this particular embodiment, the image scanned is illustrated on a display screen. The informational data is placed off to the one side of the image so that the image may be viewed unobstructed, yet also while in viewing the image in the unobstructed view. A grid 119 may be optionally placed over the image 12 in the situations where additional information is provided for specific identification of items within the image.

Figure 10:
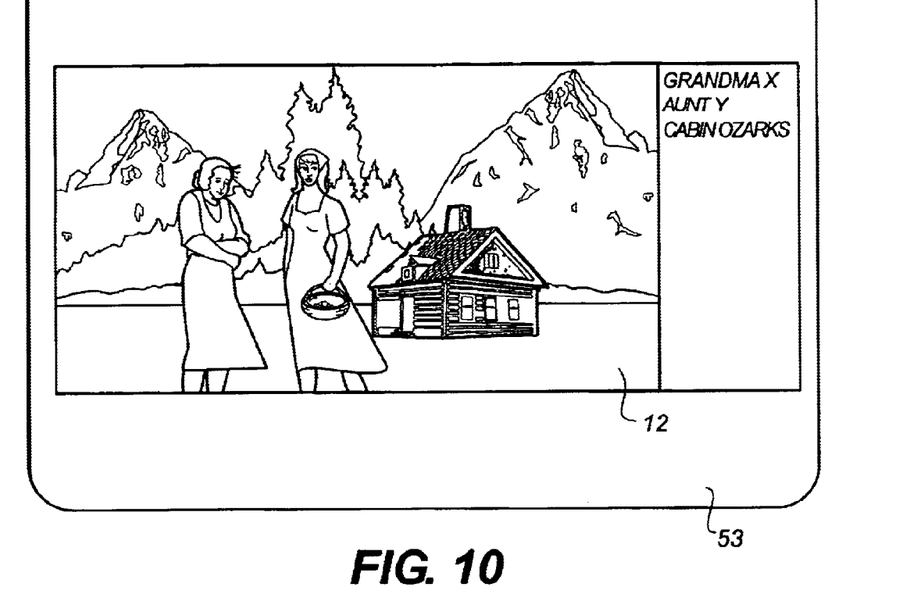
FIG. 10 is a view similar to FIG. 9 without the coordinate system.

FIG. 10 is a view similar to FIG. 9 illustrating the image without the grid system.

Figure 11:
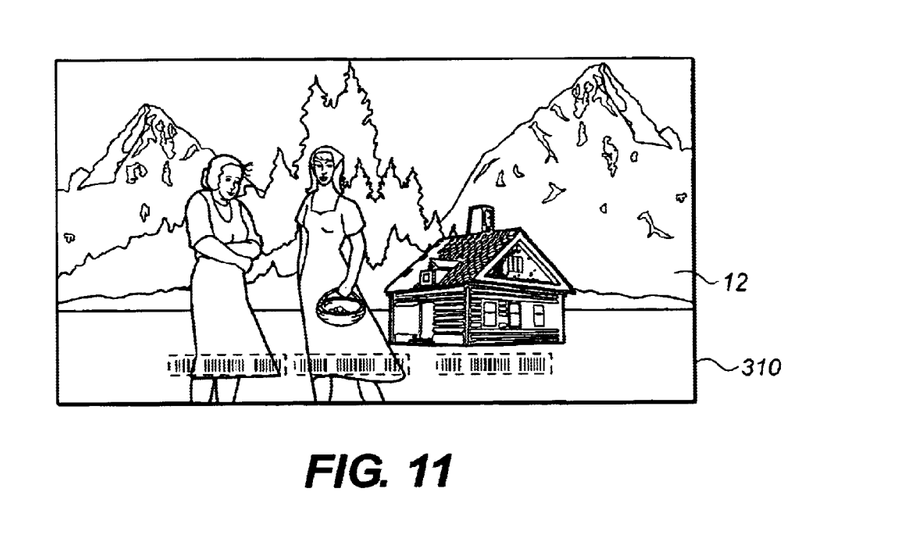
FIG. 11 is a plan elevational view of the hardcopy print made in accordance with the present invention illustrating the encoded informational data provided thereon.

Referring to FIG. 11, there is illustrated a modified hardcopy print 310 made in accordance with the present invention. The hardcopy print 310 is similar to hardcopy 10, like numerals indicating like parts. However, in this particular instance, the informational data is printed in the actual location being related to. Thus, in this situation, there is no need to provide a coordinate system.

Figure 12:
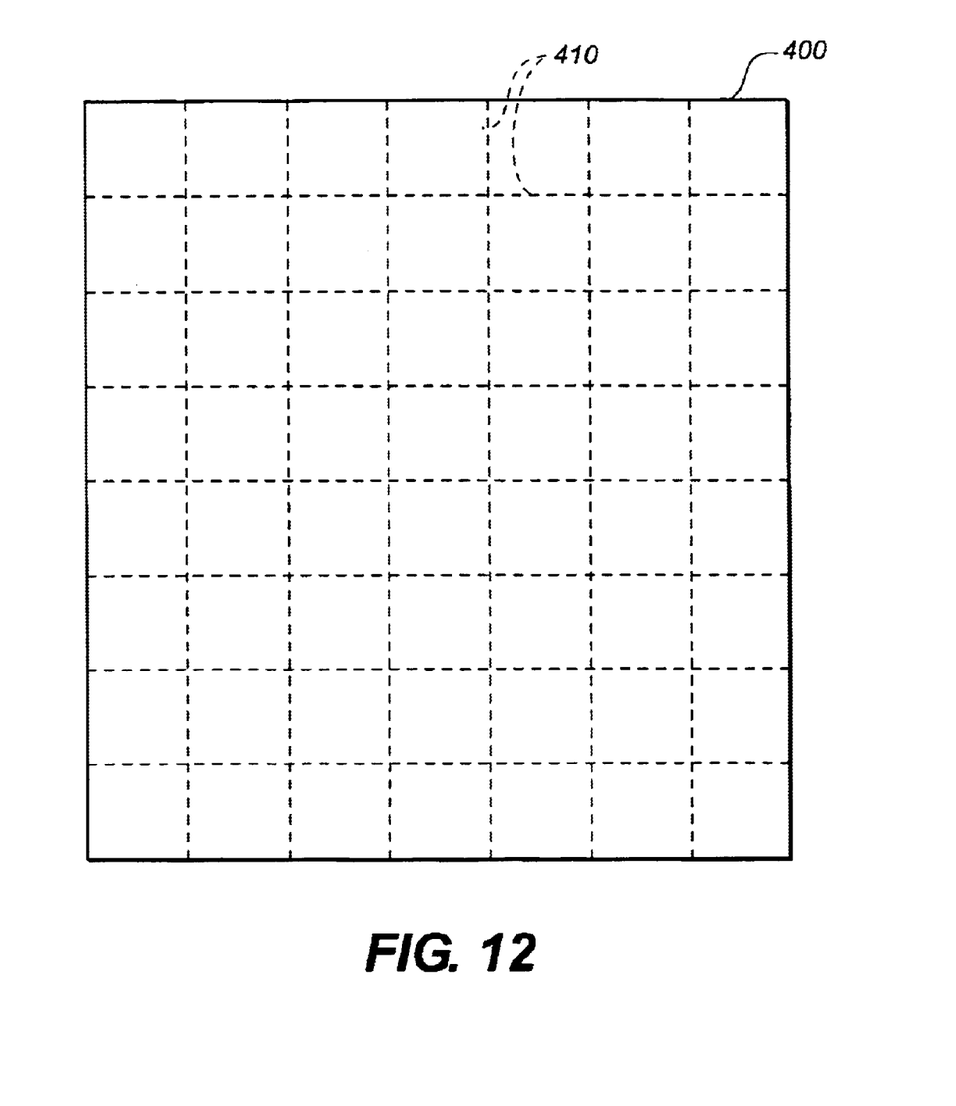
FIG. 12 is a sheet of media with a preprinted coordinate system.

Referring to FIG. 12, there is illustrated a sheet of media 400 with a preprinted coordinate system 410 in the form of a grid which is not visible to the human eye under normal viewing conditions. In the particular embodiment illustrated, the coordinate system 410 is preprinted on the media 400 using an infrared ink. The coordinate system 410 can have a specific pattern corresponds to a different type media. For example, a grid with lines spaced at ⅛ inch (3.175 mm) intervals can designate thermal media such as KODAK PROFESSIONAL EKTATHERM XLS Print Paper used with a KODAK 8650 PS Color Printer. A grid with lines spaced at ¼ inch (6.35 mm) intervals can designate inkjet media such as KODAK Inkjet Photo Stickers which can be printed on a Hewlett Packard DeskJet 870Cxi. Similarly, the coordinate system 410 can have a specific pattern which corresponds to a specific image type to be placed thereon. For example, a grid with dashed lines can designate an image originated from a digital file, while a grid with solid lines can designate an image originating from an optically captured image. Likewise, a specific pattern may indicate a professionally generated image. Care must be taken to insure the media type corresponding to the type of image being printed is used. If the media is scanned prior to printing, the printing application can indicate which media is appropriate and refuse to print for improper matches of file type and media. Additionally, in the case of professional images, the grid pattern may indicate ownership of the imagery, and can be used to prevent enabled stations from copying the image and also be used as a means for identifying the material is copyrighted.

Figure 8:
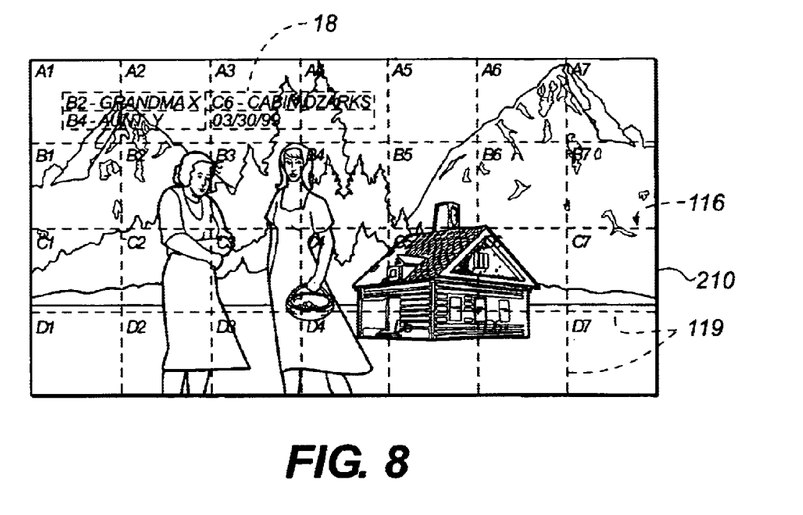
FIG. 8 is a plan view of a print illustrating an image obtained from scanning a print made in accordance with the present invention illustrating the embedded data printed thereon.

An image is printed on a media 400 having a pre-printed coordinate system 410 such as the grid not being visible to the human eye under normal viewing conditions, by first scanning the media using a scanner 30 (See FIG. 5), or the printer 40 (See FIG. 3) to determine the type and location of the pre-printed coordinate system 410 provided. Then providing an image 12 (See FIG. 1) to be printed which has information 18, such as illustrated in FIG. 8, relating to a particular location on the image which can be defined by the coordinate system and printing the image on the media in accordance with the data with respect to the coordinate system.

Alternatively, the user may indicate to the printing device which type of media is being used and which type coordinate system is to be applied thereto. Thus, the media need not be scanned for the invisible printed matter. Various other changes and modifications may be employed. For example, any desired media may be used and any desired digital printing technology may be employed, such as electrophotography or thermal printing. Additionally, when thermal printing is used, the clear top layer of the thermal media may contain the coordinate system.

The invention has been described in detail with particular reference to certain preferred embodiments thereof, but it will be understood that variations and modifications can be effected within the scope of the invention.

PARTS LIST 10 hardcopy print
12 digital image
14 printing path
16 coordinate system
18 information section
20 individual
22 individual
24 house
26 mountain
28 mountain
30 scanner
32 code
40 printer
42 printhead
43 media
44 inlet/supply
46 outlet tray
47 output device
48 printing path
49 computer
50 scanner
52 display device
53 display screen
54 computer
56 keyboard
70 printing apparatus
72 printhead
74 printing system
75 digital printhead
116 orientation system
119 grid
210 hardcopy print
310 hardcopy print
400 media
410 preprinted coordinate system

What is claimed is:

1. A method for storing and retrieving information stored on a digital print, comprising the steps of:
    a) obtaining a digital image file containing an image for printing by a digital printer;
    b) printing said image onto a media using said digital printer so as to form a digital print;
    c) printing a coordinate system on said media over said image on said digital print that is not visible to the human eye under normal viewing conditions separate from said printing of said image, said coordinate system being capable of locating a specific area of said image on said digital print;
    d) printing additional data on said media that provides information with respect to the content of said image at said specific area; and
    e) scanning said digital print so as to obtain said information and associating said information with the content of said image using said coordinate system.

2. A method according to claim 1 said additional information is capable of being scanned so as to obtain said information.

3. A method according to claim 2 wherein said information is printed directly over said image.

4. A method according to claim 2, wherein said additional information and image is obtained by a single-scanning operation.

5. A print containing an image made using a digital printer and a coordinate system separate from said image made by a digital printer on the same side as said image, said coordinate system not being visible to the human eye under normal viewing conditions and capable of locating a specific location on said image, said print also containing additional data which is not visible to the human eye under normal viewing conditions and is printed on the same side of said image, said additional data and coordinate system is read by scanning said digital print, said coordinate system is used for associating said additional data with a specific image content located on said image.

6. A print according to claim 5 wherein said print is made from a photosensitive media.

7. A print according to claim 6 wherein said photosensitive media comprises photographic paper.

8. A print according to claim 5 wherein said digital printer comprises one of the following type digital printers: thermal, inkjet, laser, LED, LCD, or electrophotographic.

* * * * *